United States Patent [19]

Anton

[11] 4,242,926
[45] Jan. 6, 1981

[54] DEVICE FOR SHARPENING SAW CHAINS

[75] Inventor: Nicholas T. Anton, Park Ridge, Ill.

[73] Assignee: Wen Products, Inc., Chicago, Ill.

[21] Appl. No.: 72,420

[22] Filed: Sep. 4, 1979

[51] Int. Cl.³ .............................................. B23D 63/16
[52] U.S. Cl. ...................... 76/25 A; 76/37; 51/208
[58] Field of Search .............. 76/25 A, 36, 37, 74; 51/170 PT, 208, 241 G, 241 S; 33/202

[56] References Cited

U.S. PATENT DOCUMENTS

| | | | |
|---|---|---|---|
| 2,664,017 | 12/1953 | Cox | 76/36 |
| 2,770,985 | 11/1956 | Pearce | 76/37 |
| 2,793,544 | 5/1957 | Rogers | 76/41 |
| 2,850,923 | 9/1958 | Gommel | 76/36 |
| 3,055,238 | 9/1962 | Hazzard | 76/36 |
| 3,091,136 | 5/1963 | Maier | 76/36 |
| 3,354,753 | 11/1967 | Kennemore | 76/37 |
| 3,738,200 | 6/1973 | Granberg | 76/25 A |
| 3,905,118 | 9/1975 | Ballew | 76/25 A |
| 4,019,407 | 4/1977 | Penberthy | 76/37 |

*Primary Examiner*—Othell M. Simpson
*Assistant Examiner*—Roscoe V. Parker
*Attorney, Agent, or Firm*—Hill, Van Santen, Steadman, Chiara & Simpson

[57] ABSTRACT

A portable electric grinding tool for use in sharpening saw chains by means of a guide attachment attachably mounted at the sharpening end of the tool. The guide attachment consists of a detachable housing axially mounted on the tool having a separately detachable and reversible guide plate mounted parallel to the axial direction of the grinder rod displaced to either side of the axis of the grinder rod.

11 Claims, 10 Drawing Figures

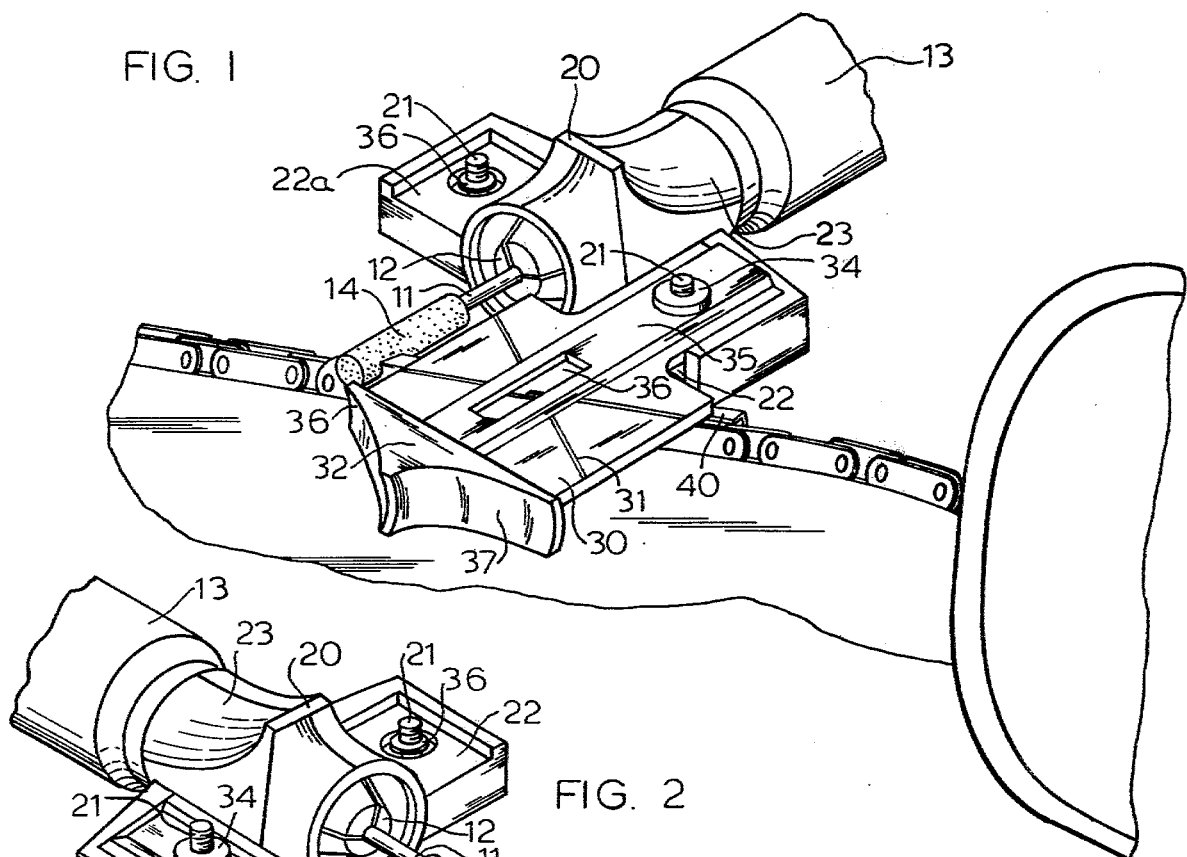
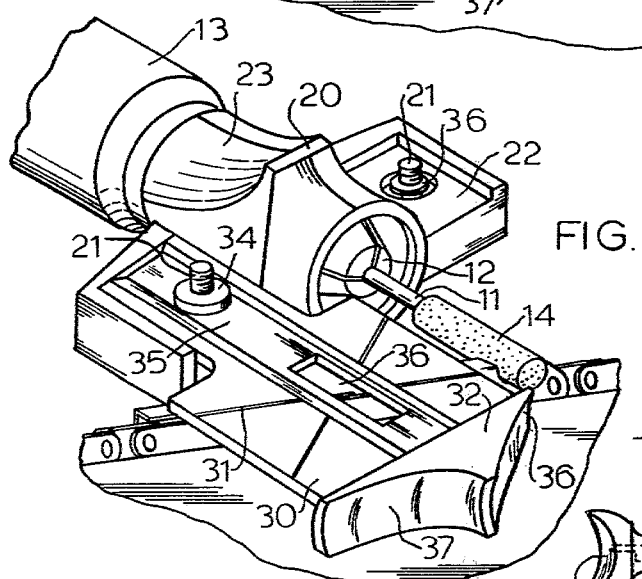
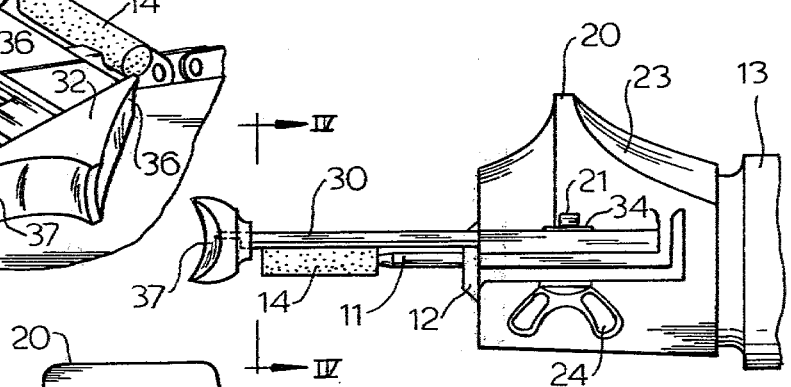
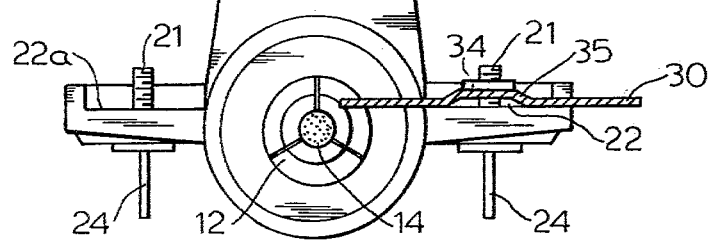

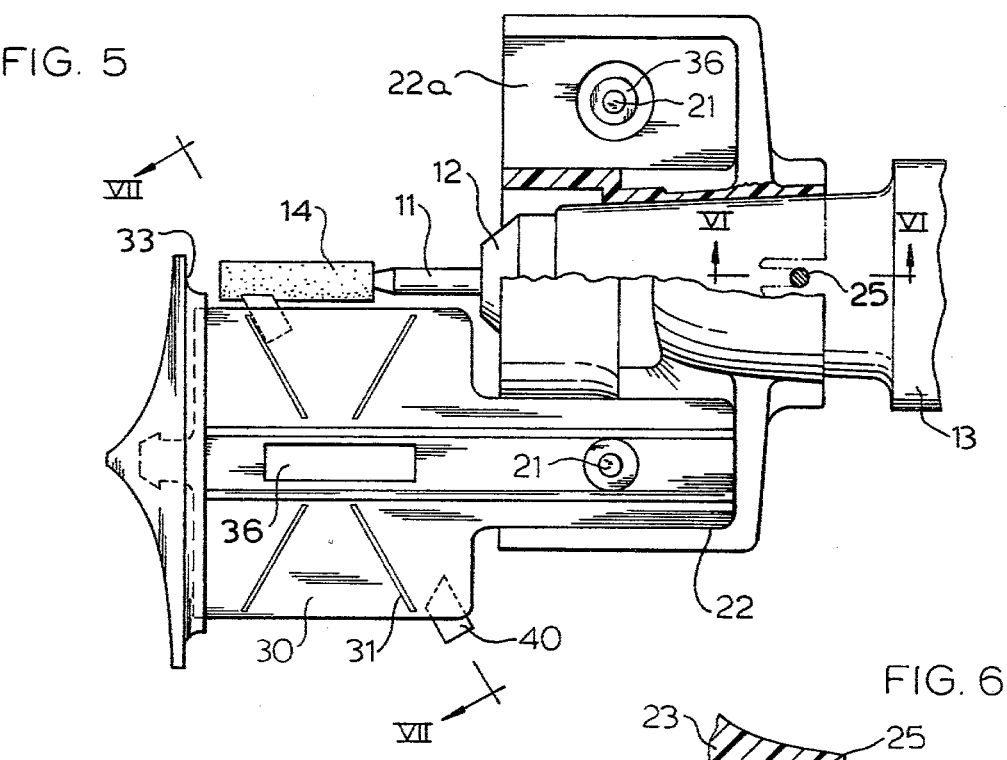
FIG. 5
FIG. 6
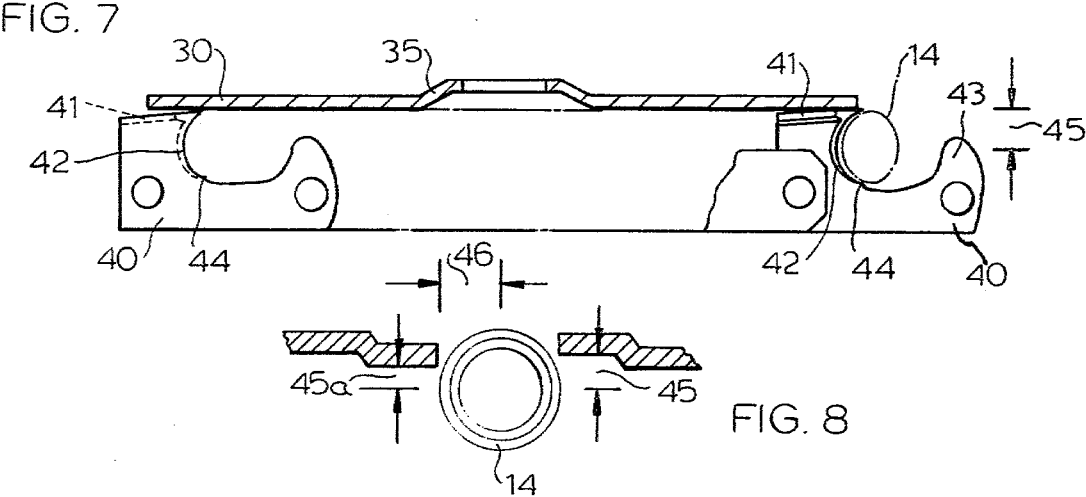
FIG. 7
FIG. 8
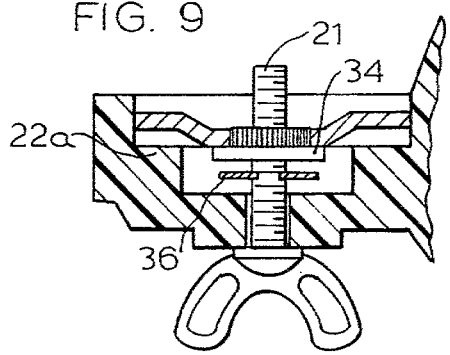
FIG. 9
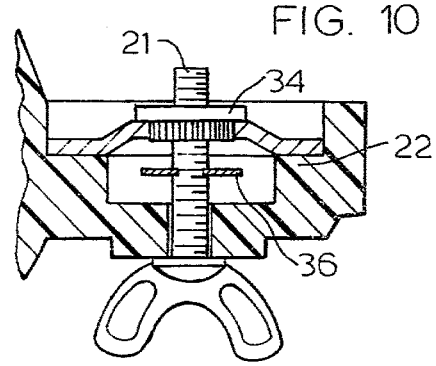
FIG. 10

DEVICE FOR SHARPENING SAW CHAINS

BACKGROUND OF THE INVENTION

1. Field of the Invention

This invention relates to a saw chain sharpening tool, and further and more particularly to a portable tool used in sharpening saw chain cutters.

2. Description of the Prior Art

Portable electric grinders with guide attachments for aligning the tool with the saw chain are known in the art. It is also known in the art to use the flat plate of the tooth of a saw chain as a planar reference point in locating the sharpening position.

Because of the need for a portable yet easy to use tool with which loggers or homeowners can accurately sharpen their saws, many attempts have been made to fill these needs, making the field somewhat crowded. Two recent patents, U.S. Pat. No. 3,354,753 issued to P. H. Kennemore and U.S. Pat. No. 4,019,407 issued to P. J. Penberthy, are attempts to use portable electric tools with attachments designed for use in sharpening saw chains.

The Kennemore patent shows a fixture which attaches to the chuck of a portable electric tool which has a pair of laterally spaced planar surface members with an elongated opening therebetween for viewing the sharpening operation. During the sharpening operation one of said planar surfaces rests on the top plate of the tooth being sharpened, the tool being properly aligned by use of angle marks on the top surface of the planar members.

The Penberthy patent shows a fixture which attaches to the grinding bit of a portable electric tool which has a guide portion consisting of a pair of surfaces and a central opening for viewing the sharpening operation. During the sharpening operation the surfaces rest on the top plate and depth guage of the tooth being sharpened, the tool being properly aligned by use of angle marks on the top surface of the guide surfaces.

SUMMARY OF THE INVENTION

The present invention provides an improvement over the existing art in that it provides for greater visibility of the sharpening process, greater accuracy of maintaining the proper sharpening angle and location, and allows for only one attachment to be required for sharpening any of the four leading saw chain sizes. These saw chain sizes are styled the ¼ pitch, the ⅜ low profile, the 0.325 pitch and the ⅜ pitch.

The invention provides a detachable guide for a portable power tool to be used in sharpening chain saws which has a detachable and reversible plate used to locate the proper position and angle that the tool is to be held in order to correctly sharpen the cutting portion of a saw chain tooth. The reversibility of the plate allows for only one plate to be required to sharpen the four leading sizes of saw chains. Also since the plate is located only on one side of the rotating grinder bit, the visibility and ease of operation are greatly improved over the prior art. Further still, because the plate rests on two saw chain teeth and because one edge of the guide plate is at the pivoting point of the lining up process, the accuracy of lining up the grinding bit with the angle of the cutting portion of a saw chain tooth is greatly enhanced.

BRIEF DESCRIPTION OF THE DRAWINGS

FIG. 1 is a perspective view of a saw chain sharpening device during the sharpening operation.

FIG. 2 is a perspective view of the saw chain sharpening device of FIG. 1 during the sharpening operation of an alternate tooth showing the guide plate attached to the opposite channel from FIG. 1.

FIG. 3 is a side view of the saw chain sharpening device of FIG. 1.

FIG. 4 is a view taken along line IV—IV of FIG. 3.

FIG. 5 is a top view of the saw chain sharpening device of FIG. 1.

FIG. 6 is a partial sectional view of the snap-lock mechanism.

FIG. 7 is a partial sectional view of the guide plate and saw chain teeth along line VII—VII.

FIG. 8 is a diagramatic view showing the relative positions of the guide plate and the grinding rod in the two different positions of operation.

FIG. 9 is a cross-sectional view of the fastening method of the guide plate in position "A."

FIG. 10 is a cross-sectional view of the fastening method of the guide plate in position "B."

DESCRIPTION OF THE PREFERRED EMBODIMENTS

A saw chain sharpening device is generally illustrated at 10 in FIGS. 1 and 2 as comprising a housing 20 which snap-locks onto the neck of a power tool 13, a selectively mounted reversible guide plate 30 and an interchangeable grinding bit 14. A chuck 12 of the power tool 13 clamps onto a shaft 11 of the grinding bit 14 allowing for axial rotation of the grinding bit 14 during the sharpening operation.

The housing 20 snap-locks onto the power tool 13 by means of a spring operated knob 25 shown in FIGS. 5 and 6. The housing 20 contains two parallel channels 22 and 22a for receiving the guide plate 30 and are horizontally displaced from the center of the housing 20 and vertically displaced above the axis of the grinding bit 14. A screw 21 with a wing nut head 24 may be permanently mounted in these channels 22 and 22a. A locking ring 36 shown in FIG. 7 may be mounted on the screw 21 to keep it permanently in place. The housing 20 also contains a gripping area 23 for placement of a thumb during the sharpening operation.

The guide plate 30 removably attaches in the channel 22 or 22a of the housing 20 by means of the screw 21 being threaded through a nut 34 which may be press fit to permanently remain in the guide plate 30. The guide plate 30 may have a viewing slot 36 and permanently marked guide lines 31 for use in lining up the sharpening device with the saw chain during operation as shown in FIG. 5. A front grip 32 can be permanently attached to the guide plate 30 which consists of a grip area 37 for placement of a finger during the sharpening operation and a guard area 33 shown in FIG. 5 for safety during the operation. The guide plate 30 can have a shim and stiffening rib 35 shown also in FIG. 5 which would allow for two different positions of the guide plate 30 during the operation as shown in FIGS. 9 (position "A") and 10 (Position "B") allowing for the same guide plate to be used to sharpen four different sizes of saw chains.

As shown in FIGS. 3 and 4, when the guide plate 30 is mounted in the channel 22 or 22a of the housing 20, it is vertically displaced above the axis of the grinding bit 41 during the sharpening operation.

Referring to FIG. 7, a saw chain is comprised of teeth 40, each having a top plate 41, a cutting portion 42, a depth guage 43, and a gullet 44 between the cutting portion 42 and the depth guage 43. During the sharpening operation the guide plate 30 rests on top plates 41 of two adjacent teeth 40 at the point where the top plate 41 and cutting postion 42 meet, creating a reference plane which allows proper placement 45 of the grinding bit 14 against the cutting portion 42 of the tooth 40 being sharpened. Since a saw chain consists of alternating left and right hand mounted teeth 40 the sharpening operation consists of sharpening all similar teeth 40 first, and then the guide plate 30 must be moved to the opposite channel 22 or 22a in order to sharpen the alternate teeth.

FIG. 8 shows the vertical displacement 45 and 45a and the horizontal displacement 46 between the axis of the grinding bit 14 and the guide plate 30 in the two different positions of operation and with the three different sizes of grinding bits 14 used in sharpening the four major sizes of saw chains.

Although other embodiments may be suggested by those skilled in the art, it should be understood that I wish to embody within the scope of the patent warranted hereon all such modifications as properly come within the scope of my contribution to the art.

I claim as my invention:

1. A saw chain sharpening device comprising:
    a portable electric grinding tool consisting of a protective and easy grip housing enclosing an electrically driven motor which rotatably turns a chuck, adjustable to receive various sized grinding bits;
    a detachable housing with two channels laterally spaced from a central opening which allows for mounting on a portable electric grinding tool, a means of fastening a guide plate in each of the channels, a thumb grip on the upper rear surface of the housing, and a means for locking the housing onto the electric grinding tool;
    a grinding bit, one end of the bit to be clampedly attached to the chuck of the portable electric grinding tool, the other end of the bit containing a grinding portion of a size required to sharpen the cutting portion of a saw chain; and
    a guide plate which removably mounts in either channel of the housing so as to be parallel with the axis of the grinding bit and so as to rest on the top plates of adjacent teeth of a saw chain, being displaced from the axis of the grinding bit for proper placement of the grinding bit against the cutting portion of the saw chain tooth.

2. For use with a portable electric grinding tool or drill, a saw chain sharpening device comprising:
    a detachable housing with two channels laterally spaced from a central opening which allows for mounting on a portable electric grinding tool, a means of fastening a guide plate in each of the channels, a thumb grip on the upper rear surface of the housing, and a means for locking the housing onto the electric grinding tool;
    a grinding bit, one end of the bit to be clampedly attached to the chuck of the portable electric grinding tool, the other end of the bit containing a grinding portion of a size required to sharpen the cutting portion of a saw chain; and
    a guide plate which removably mounts in either channel of the housing so as to be parallel with the axis of the grinding bit and so as to rest on the top plates of adjacent teeth of a saw chain, being displaced from the axis of the grinding bit for proper placement of the grinding bit against the cutting portion of the saw chain tooth.

3. The saw chain sharpening device of claim 2, wherein a front grip is permanently attached to the front end of said guide plate which has a finger grip area at the very front of the grip and a guard area adjacent the position of said grinding bit.

4. The saw chain sharpening device of claim 2, wherein a wing screw is used to fasten the guide plate to the channel of the housing.

5. The saw chain sharpening device of claim 4, wherein a nut is permanently press fit into said guide plate to receive said wing screw when placed in said channel of the housing.

6. The saw chain sharpening device of claim 4, wherein said wing screw is permanently captured in the housing by means of a locking ring placed on the shaft of the screw in the space within the housing between the floor of the channel and the bottom of the housing.

7. The chain saw sharpening device of claim 2, wherein said guide plate has permanently marked diagonal guide lines for use in lining up the sharpening device during operation.

8. The saw chain sharpening device of claim 2, wherein said guide plate is constructed so as to have a shim and stiffening rib of such a dimension as to define two reversible positions of said guide plate which allow for proper positioning of said grinding bit against the cutting portion of four different sized saw chains.

9. The saw chain sharpening device of claim 8, wherein said grinding bit is of three different sizes as to allow for the sharpening of four different sized saw chains.

10. The saw chain sharpening device of claim 2, wherein said guide plate has a viewing slot longitudinally placed therein to permit greater visibility of the saw chain which will aid in lining up the device prior to and during the sharpening operation.

11. The method of sharpening a saw chain which comprises mounting a housing on the neck of a portable electric grinding tool or drill around the chuck of the tool, securing a grinding bit in the chuck to project therefrom, selectively positioning a guide plate in a channel of the housing, resting said guide plate on the top plates of two adjacent saw chain teeth, one of which is to be sharpened, aligning the device relative to the run of the saw chain by reference to guide lines marked on the guide plate, positioning the grinding bit against the cutting portion of the saw tooth to be sharpened, turning on the electric motor of the tool and oscillating the tool in a line consisting of the axis of the grinding bit until the cutting portion is sharpened, turing off the motor and moving the device to the tooth next beyond the next adjacent tooth and continuing the sharpening operation as detailed above, continuing to move around the saw chain sharpening every other tooth until a return to the originally sharpened tooth is made, removing the guide plate from the channel, reversing it and mounting it in the opposite channel for sharpening the still dull oppositely angled teeth in a like manner as described above until all teeth have been sharpened.

* * * * *